(12) United States Patent
Huang et al.

(10) Patent No.: US 10,448,237 B2
(45) Date of Patent: Oct. 15, 2019

(54) RRM REQUIREMENT FOR D2D INTER-CARRIER DISCOVERY GAP

(71) Applicant: INTEL IP CORPORATION, Santa Clara, CA (US)

(72) Inventors: Rui Huang, Beijing (CN); Yang Tang, Pleasanton, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/756,943

(22) PCT Filed: Sep. 30, 2016

(86) PCT No.: PCT/US2016/054768
§ 371 (c)(1),
(2) Date: Mar. 1, 2018

(87) PCT Pub. No.: WO2017/062278
PCT Pub. Date: Apr. 13, 2017

(65) Prior Publication Data
US 2018/0279109 A1 Sep. 27, 2018

Related U.S. Application Data

(60) Provisional application No. 62/237,335, filed on Oct. 5, 2015.

(51) Int. Cl.
*H04W 8/00* (2009.01)
*H04W 72/12* (2009.01)
(Continued)

(52) U.S. Cl.
CPC ....... *H04W 8/005* (2013.01); *H04W 72/0446* (2013.01); *H04W 72/12* (2013.01); *H04W 72/1289* (2013.01); *H04W 48/16* (2013.01)

(58) Field of Classification Search
CPC . H04W 8/005; H04W 72/0446; H04W 72/12; H04W 72/1289; H04W 48/16
See application file for complete search history.

(56) References Cited

U.S. PATENT DOCUMENTS

2013/0235840 A1 9/2013 Xiao et al.
2015/0098416 A1 4/2015 Kuo et al.
(Continued)

FOREIGN PATENT DOCUMENTS

WO 2015136040 9/2015

OTHER PUBLICATIONS

Korean IP Office, International Search Report of the International Searching Authority, dated Jan. 13, 2017 for International Application No. PCT/US2016/054768 (5 pgs).

(Continued)

*Primary Examiner* — Duc C Ho
(74) *Attorney, Agent, or Firm* — Womble Bond Dickinson (US) LLP (57) ABSTRACT

A radio resource management requirement is described for a device-to-device inter-carrier discovery gap. A device to device (D2D) user equipment (UE) interruption requirement can be specified in which the interruption is not allowed. In one example, operations include receiving device-to-device (D2D) discovery data on a D2D discovery data frequency in a receive chain of a user equipment (UE) during a set of subframes, tuning the receive chain of the UE to a wireless access network (WAN) data frequency, and receiving WAN data in the receive chain of the UE on the WAN data frequency from a primary cell (PCell) during the set of subframes, wherein the D2D discovery data is received during a gap in receiving the WAN data without an interruption in the WAN data.

19 Claims, 5 Drawing Sheets

(51) Int. Cl.
*H04W 72/04* (2009.01)
*H04W 48/16* (2009.01)

(56) References Cited

U.S. PATENT DOCUMENTS

| | | | | |
|---|---|---|---|---|
| 2016/0094975 A1* | 3/2016 | Sheng | ............ | H04W 72/042 370/216 |
| 2016/0330676 A1* | 11/2016 | Thangarasa | ............ | H04W 76/14 |
| 2017/0041773 A1* | 2/2017 | Fujishiro | ............ | H04W 8/005 |
| 2017/0251509 A1* | 8/2017 | Siomina | ............ | H04W 8/005 |

OTHER PUBLICATIONS

Korean IP Office, Written Opinion of the International Searching Authority, dated Jan. 13, 2017 for International Application No. PCT/ US2016/054768 (10 pgs).

CATT, "Consideration on Gap Configuration and UE Capabilities." R2-154047, 3GPP TSG-RAN WG2 Meeting #91bis, Malmo, Sweden, Oct. 5-9, 2015.

Hauwei—Hisilicon, "Impact analysis of sidelink gap." R2-153236, 3GPP TSG-RAN WG2 Meeting #91, Beijing, China, Aug. 24-28, 2015.

Kyocera, "Sidelink gap details for direct discovery." R2-153348, 3GPP TSG-RAN WG2 #91, Beijing, China, Aug. 24-28, 2015.

LG Electronics, "CR on interruption during D2D discovery for D2D single RF chain." R4-153174, 3GPP TSG-RAN WG4 Meeting #75, Fukuoka, Japan, May 18, 2015.

PCT Application No. PCT/US2016/054768, Notification Concerning Transmittal of International Preliminary Report on Patentability, dated Apr. 19, 2018, 7 pgs.

Huawei et al., 'Impact analysis of sidelink gap', R2-153236, 3GPP TSG-RAN WG2 Meeting #91, Beijing, China, Aug. 15, 2015.

CAAT, 'Considertaion on Gap Configuration and UE capabilities', R2-154047, 3GPP TSG RAN WG2 Meeting #91bis, Malmo, Sweden, Sep. 26, 2015.

Kyocera, 'Sidelink gap details for direct discovery', R2-153348, 3GPP TSG-RAN WG2 #91, Beijing, China, Aug. 14, 2015.

* cited by examiner

RRM REQUIREMENT FOR D2D INTER-CARRIER DISCOVERY GAP

CROSS-REFERENCE TO RELATED APPLICATIONS

This patent application is a U.S. National Phase application under 35 U.S.C. § 371 of International Application No. PCT/US2016/054768, filed Sep. 30, 2016, entitled RRM REQUIREMENT FOR D2D INTER-CARRIER DISCOVERY GAP, which claims priority to U.S. Provisional Application Ser. No. 62/237,335, filed Oct. 5, 2015, entitled RRM REQUIREMENT FOR D2D INTER-CARRIER DISCOVERY GAP, the priority of which are hereby claimed.

FIELD

The present description relates to the field of wireless communications in LTE (Long Term Evolution) and, in particular to an inter-carrier discovery gap for device to device communications.

BACKGROUND

In wireless cellular communications virtually all communications are between a UE (User Equipment) and a base station, such as a U-ETRAN (Evolved Universal Terrestrial Radio Access Node) or eNB (evolved Node B). This ensures that communications are secure, interference in the network is managed, and account credentials are maintained.

D2D (Device-to-Device) communications are being developed to allow two remote devices to communicate directly with each other without going through a base station and the network infrastructure. While this is currently done in some cases, it requires a completely different wireless protocol, frequency bands and radios, such as NFC (Near Field Communication), Bluetooth or WiFi. Running D2D communications through a cellular or LTE (Long Term Evolution) radio allows the communications to be integrated seamlessly with other cellular interactions such as messaging and voice calls, etc. This has a possibility for reducing network traffic and reducing latency between users that are physically much closer to each other then they are to a base station. For users that are very close together there may also be a benefit of reducing radio transmission power which reduces interference for other users.

D2D may also be used for other types of services in which proximity or speed is important. In proximity-based services a UE is detected as being nearby and this triggers special services such as social applications, advertisements, local information about a venue or store, safety warnings, smart communication between vehicles, etc. Another service may be public safety where a user device can contact others nearby if the network infrastructure is damaged.

Network controlled D2D maintains a role for the cellular network infrastructure. Unlike NFC, Bluetooth, and WiFi, the network infrastructure controls and assists the efficient operation of D2D links. This is particularly valuable when D2D links coexist with cellular communications within the same shared cellular radio frequency bands. The cellular network infrastructure is already aware of other UEs and their locations and configurations. Accordingly, the network infrastructure is able to configure and establish D2D links more quickly than a UE by itself. The network infrastructure can also monitor links and handover a session to a conventional link through a base station if one of the UEs moves away from the other.

D2D discovery is intended to allow a UE to independently find nearby people, information, products, or services and then communicate directly with them with minimal interaction with the cellular network infrastructure. The use of LTE frequencies and protocols by multiple UEs without the control of a base station requires that the discovery process and sessions be integrated into the overall system of uplink and downlink messages.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

The independence of D2D is improved when each UE is able to use an autonomous discovery process. This allows the UE to discover other UEs and other carriers without assistance from the network. Discovery is expanded when it includes other carriers outside the cellular network infrastructures or PLMN (Public Land Mobile Network) such as non-camped carriers. D2D discovery support can be enhanced in the presence of multiple carriers and PLMNs. In some cases, D2D transmissions may be allowed in a non-serving carrier and/or secondary cell belonging to the same and possibly a different PLMN as the serving cell.

Different scenarios have been identified. A first scenario is intra-PLMN discovery. In this case, a UE may be allowed an option to transmit discovery in another carrier via RRC (Radio Resource Control) signaling. The RRC signaling may be used to configure either Type 1 or Type 2 discovery configurations for the non-primary carrier.

A second scenario is inter-PLMN discovery using the network infrastructure. If the network has inter-PLMN information then the network may optionally configure the UE in a way similar to the intra-PLMN case. On the other hand, if inter-PLMN coordination is not possible, then a baseline scenario may be uncoordinated inter-PLMN discovery. In this baseline scenario, the UE reads SIB19 (System Information Block 19) of the concerned carrier frequency to learn the transmit/receive resource pool to use.

A third scenario is inter-PLMN discovery without the network infrastructure. In this case, there is, for example, no eNB (enhanced Node B) in the ProSe (Proximity Services) carrier. This scenario may be supported assuming that out-of-coverage discovery is supported.

For the inter PLMN scenario TX/RX gaps are proposed for use in D2D discovery. To enhance inter-carrier discovery performance for the non-dedicated transceiver case, gaps may be introduced to allow reusing an RF (Radio Frequency) transmitter/receiver chain for direct discovery transmissions/receptions. The gaps may be under network control.

The RRM (Radio Resource Management) requirements due to the gaps for inter-PLMN D2D discovery enhancements may be specified to ensure uniform reliable service. Interruption requirements for inter-carrier and inter-PLMN D2D discovery enhancement may also be specified in the 3GPP (Third Generation Partnership Project) specifications.

Interruptions are already supported in other parts of 3GPP. As examples, there is an interruption for the RF chain returning to other frequency carriers, e.g. the interruption during measurements on SCC Session Centralization and Continuity) for inter-band CA (defined in Section 7.8.2.6 in 3GPP TS (Third Generation Partnership Project Technical Specification) 36.133 v12.4.) There is also an interruption in a UE transceivers' power down/up or on/off. More specifically, there is an interruption at SCell (Secondary Cell) addition/release for both intra-band and inter-band CA (Carrier Aggregation) (defined in Section 7.8.2.1 and 7.8.2.2 in 3GPP TS36.133 v12.4.)

It can be said that gaps introduced for discovery transmission and reception should apply to both inter-frequency and inter-RAT (Radio Access Technology) cases for connected mode UEs. The eNodeB may be configured to control the gap configuration on a per UE basis. A gap created for discovery should take into account additional overhead (for synchronization and subframe offset) and interruption time for retuning. If the gaps are controlled by the eNB, then the UE may be configured to request gaps for discovery reception and/or transmissions. In the request, the UE may inform the eNB of the subframes (corresponding to the timing of the serving cell) on which the UE needs gaps for transmission and/or reception.

In the examples described herein the D2D discovery data is received during a gap in receiving the WAN data without an interruption in the WAN data. The interruption requirements depend on the gap configuration. If there is no gap or if WAN data is transmitted during the gap then an interruption may be required. On the other hand if data is not scheduled during the gap, then no interruption is needed. When the system operates under control of an eNB, the eNB will not schedule any WAN data transmission during the gap, that is during the time that the UE is receiving the D2D discovery data.

Figure 1:
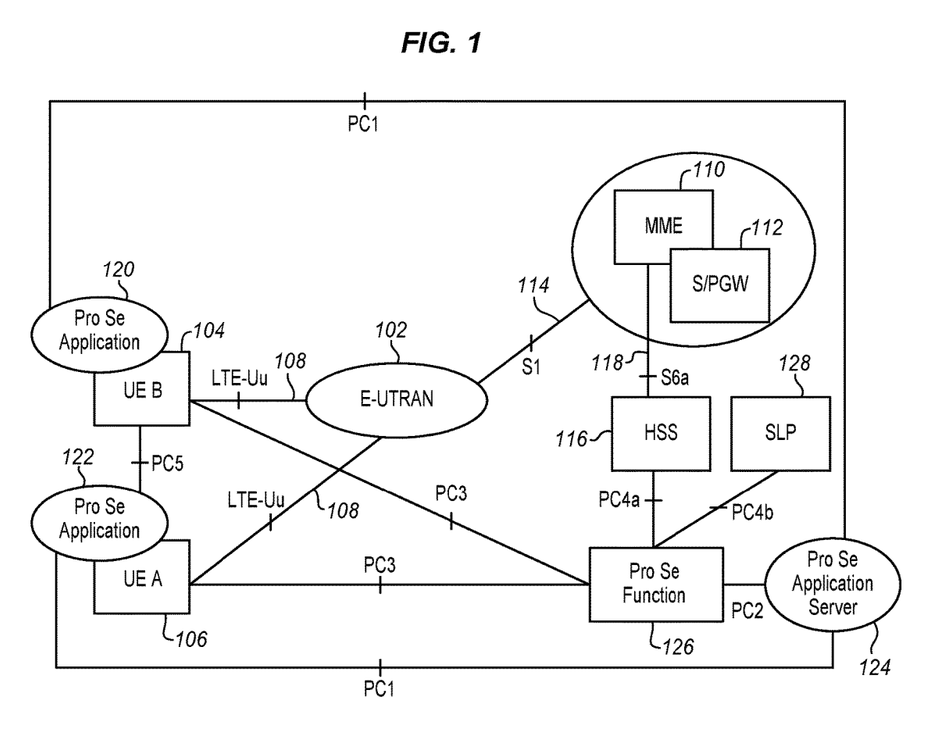
FIG. 1 is a block diagram of a portion of an LTE network in a vehicular environment with proximity services (ProSe) according to an embodiment.

FIG. 1 is a diagram of a portion of an LTE (Long Term Evolution) network with proximity services (ProSe). The network includes an evolved universal terrestrial radio access network (E-UTRAN) 102 coupled to a first user equipment (UE), UE A 104 and a second UE, UE B 106 through an LTE air interface physical layer Uu link 108. The UEs are also able to communicate directly with each other through a PC5, WLAN (Wireless Local Area Network), Wi-Fi, or other communications link. As described herein, a 3GPP WAN connection may be added to these connections through D2D discovery. The E-UTRAN 102 connects to a mobility management entity (MME) 110 and to a serving gateway (SGW) or packet data network (PDN) gateway (PGW) 112 through an Si physical layer interface 114. The MME or S/PGW connects to a home subscriber server (HSS) 116 through a PC4, S6, or other physical data layer link 118.

The proximity services use a ProSe application 120, 122 at each participating UE coupled to one or more ProSe application servers 124 through a PC1 or similar link. The ProSe application server delivers ProSe functions 126 to the UEs 104, 106 through a PC3 or similar link. The ProSe application servers also deliver ProSe functions to the HSS 116 and a SUPL (Secure User Plane Location) location platform (SLP) 128 through PC4 or similar links which delivers location awareness to the UEs and to any other mobile nodes in the system. The ProSe function may also connect with other services and systems as desired to perform the described and other functions.

The LTE ProSe specification provides various functionalities and interfaces as shown. ProSe (also referred to as direct device-to-device (D2D) communications) may allow a first user equipment (UE) to detect the presence of a second UE that is proximate to the first UE, establish a direct connection or communication session, and communicate with the second UE over the direct connection. The LTE ProSe specification provides for the EPC (Enhanced Packet Core) support for WLAN direct discovery and communication. This functionality allows the EPC network to enable two or more ProSe-enabled WLAN-capable UEs to directly communicate using WLAN technology. This decision can be taken, for example, when the EPC network supports EPC-level ProSe discovery and becomes aware that two or more UEs are in close proximity and when the EPC network knows that a first UE (UE-A) requests to communicate with a second UE (UE-B).

Figure 2:
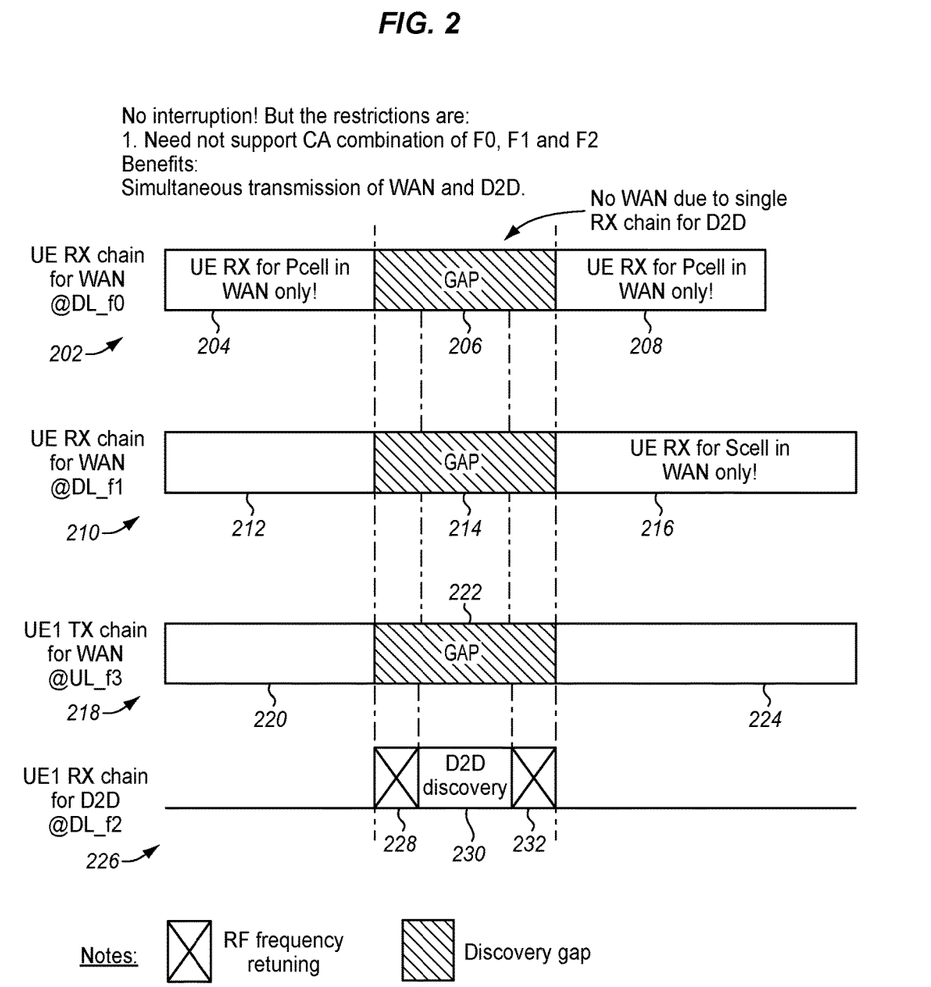
FIG. 2 is a timing diagram of signals at a UE including a D2D inter-carrier discovery gap according to an embodiment.

FIG. 2 is a timing diagram of different signals at different frequencies at a single UE in a 3GPP WAN (Wide Area Network) protocol over time on the horizontal axis. This shows one example of an inter-carrier/inter-PLMN D2D gap. The top line 202 shows a portion of a UE receive chain for WAN at a first (f0) downlink (DL) frequency being received at the UE. This downlink chain has a UE receive segment 204 for Pcells (Primary Cells) only in the WAN, followed by a gap 206 and then followed by a continuation 208 of the UE receive segment. These segments are made up of subframes. In the gap 206, there is no WAN data because the single receive chain that is used for WAN data is being used for D2D discovery data 230. As described below the gap 206 is long enough for receive chain retuning 228, 232 as well as for D2D discovery data 230.

The second line 210 is a UE receive chain at the UE for WAN at a second downlink frequency (f1) for an SCell (Secondary Cell). This receive chain also has a first downlink segment 212 interrupted by a gap 214 of the same size as the gap of the first receive chain followed by a continuation 216 of the receive chain.

A third line 218 is a UE transmit chain transmitted by the same UE for WAN at an uplink (UL) frequency (f3). It has a first transmit segment 220 and a gap 222 followed by a continuation 224 of the transmit chain. If D2D discovery data is to be transmitted, then it may be transmitted during the gap. If not then WAN data may be transmitted instead of the gap. While two downlink chains and one uplink chain is shown, there may be many more or even fewer chains at any particular time.

A fourth line 226 represents a time for D2D discovery on a UE receive chain downlink signal on another frequency shown here as f2, but any other frequency resources may be used. The receive chain has a D2D discovery chain 230 with a guard time subframe before 228 and after 232 the discovery subframe. The guard time subframe allows for the UE to retune its RF frequency to receive discovery information.

If the gap starts 1 subframe before the D2D discovery and ends after 1 subframe, as shown, then there is no interruption to the WAN data of the UE receive and transmit chains. The gap 206, 214, 222 may be placed to overlap with the duration of RX chain retuning to other carriers. This retuning time corresponds to the guard time 228, 232 of the discovery UE receive chain 226.

The signals and gaps described above are particularly suitable when an eNB knows the discovery RA. In this case the gap before and after the D2D Discovery can be scheduled by the eNB. If the discovery RA is not known, then a 1 ms interruption will occur instead. In this case, the UE is allowed an interruption of up to 1 subframe that is N subframes before and after an UL subframe that is configured for ProSe Direct Discovery by the eNodeB. The value of N, in such a case may be selected as ceil (w1/1 ms) subframes when a parameter discSyncWindow is configured with the value w1 in the sidelink synchronization resource configuration associated with the ProSe Direct Discovery subframe. Otherwise the value of N may be selected as 1 subframe. The interruptions are for both uplink and downlink of PCell. The interruption for the ProSe UE may occur while switching a receiver chain ON/OFF for ProSe Direct Discovery if the UE has a dedicated receiver chain for discovery.

A UE capable of ProSe Direct Discovery may indicate its interest (initiation or termination) in ProSe Direct Discovery to the connected eNodeB using IE SidelinkUEInformation. This may be transmitted during a UE Tx chain. The UE is allowed an interruption of up to 1 subframe on PCell during the RRC reconfiguration procedure that includes the ProSe Direct Discovery configuration message. This interruption is for both uplink and downlink of PCell.

As shown, with the discovery gap placed in the Pcell of the receive chains, there is no interruption. The restrictions are that there is no need to support CA for the combination of f0, f1, and f2. The WAN uplink and downlink are essentially simultaneous with the D2D receive discover signals. There is only a small gap as shown. In other words, there is no interruption to the WAN signaling because the D2D discovery gap may include the RF retuning time 228, 232 of the RX chain.

In FIG. 2 the UE is configured to have two active receive chains at the same time. The two signals 202, 210 are received simultaneously on (f0, f1), so the gap 206 in the WAN data allows one receive chain to retune to downlink frequency f2 228, receive the D2D data 230, retune to f0 232, and then go back to receiving the WAN data 208. On the other hand in FIG. 3, the UE receives WAN data and D2D data simultaneously on f0, f1, f2, so the gaps are only used during retune to reduce interference from the D2D receive chain at the WAN receive chains.

Figure 3:
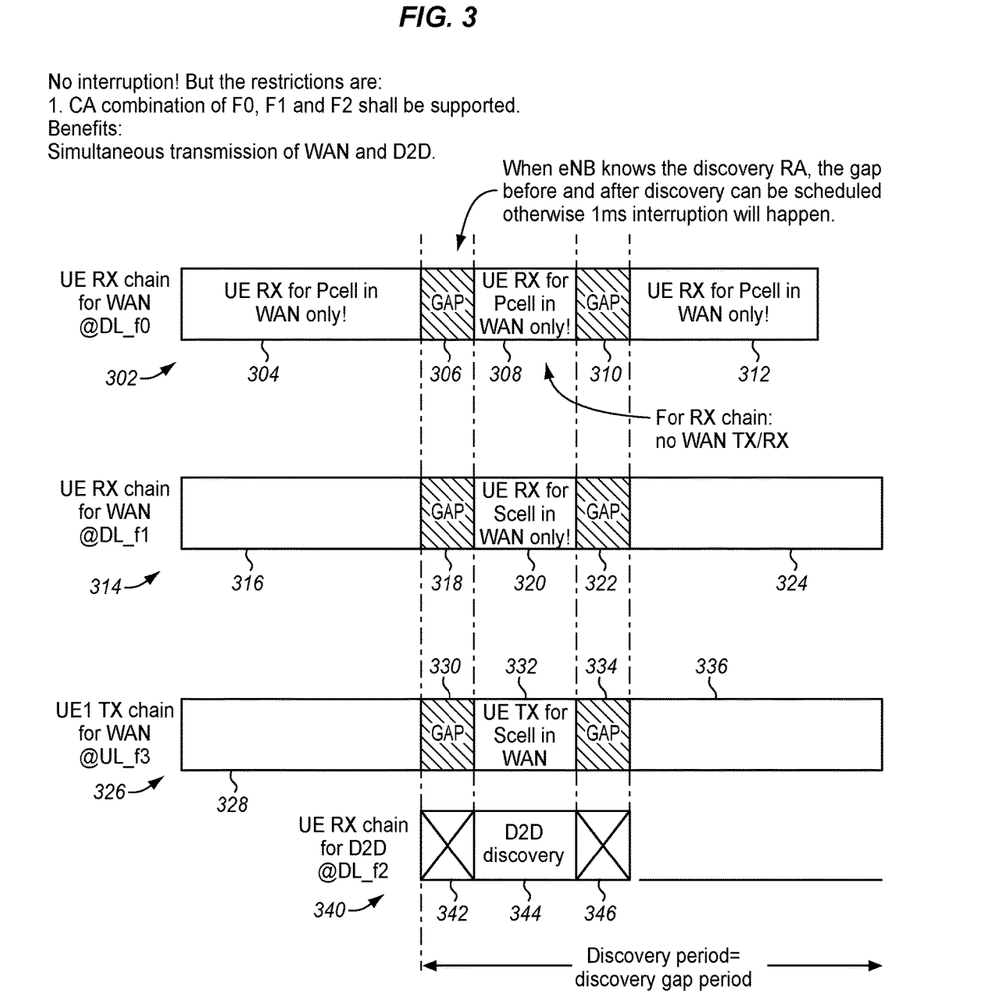
FIG. 3 is an alternative timing diagram of signals at a UE including a D2D inter-carrier discovery gap according to an embodiment.

FIG. 3 is a diagram of different signals at different frequencies in a 3GPP WAN protocol over time on the horizontal axis. This diagram shows a modification to support public safety uses of D2D discovery. In this case a dedicated receive chain is reserved for D2D discovery. This allows for simultaneous D2D discovery and WAN data reception. As a result, the discovery gap may be shorter than in the general example described above. This shorter duration also reflects the reduced duration required to allow for receive RF retuning. This also provides a more efficient resource utilization overall.

In this example, there also is no interruption but a restriction may be required. The restriction would be that CA combinations of the receive downlink frequencies shall be supported. This configuration also allows simultaneous reception of WAN and D2D data.

A top line 302 shows a portion of a UE receive chain for WAN at a first (f0) downlink frequency. This downlink chain has a UE receive segment 304 for Pcells only in the WAN, followed by a gap 306 and then followed by a continuation 308 of the UE receive segment, then another gap 310 and then the receive section continues 312. In this case, there is a smaller gap before 306 and after 310 a receive section 308. This gap may be scheduled before and after a D2D discovery downlink 344 in the fourth line when the eNB knows the discovery RA. If there is no scheduled gap, then there may be an interruption before and after the discovery RA. In current timing, this interruption will be about 1 ms, but may have different durations, depending on the particular implementation. By using the eNB scheduling, the interruption may be avoided.

The second line 314 is a UE receive chain for WAN at a second downlink frequency (f1) for an SCell at the UE. This receive chain also has a first downlink segment 316 with a gap 318 followed by more receive segment 320, another short gap 322 and the rest of the receive segment. The gaps 318, 322 are of the same size as in the first receive chain as is the section 310, 308 in between. As in the first line, the gaps 318, 322 are aligned with the D2D RF retuning time 342, 346 in the D2D discover line 340.

A third line 326 is a UE transmit chain for WAN at an uplink frequency (f3). It has a first transmit segment 328 and two gaps 330, 334 with a transmission segment 332 in between all followed by a continuation 336 of the transmit chain. This uplink chain gaps are optional, depending on whether D2D discovery includes transmit and the configuration of the UE. As mentioned above, there may be many more or even fewer transmit and receive chains at any particular time.

A fourth line 226 represents a time for D2D discovery on a UE receive chain downlink signal on another frequency shown here as f2, but any other frequency resources may be used. The receive chain has a D2D discovery chain 230 with a guard time subframe before 228 and after 232 the discovery subframe. The guard time subframes allow the UE to retune its RF frequency to receive discovery information.

If the gap 342 starts 1 subframe before the D2D discovery and ends 346 after 1 subframe, as shown in the fourth line 340, then there is no interruption to the WAN data of the UE receive 302, 314 and transmit 326 chains. The gap 206, 214, 222 may be placed to overlap with the duration of RX chain retuning to other carriers. This retuning time corresponds to the guard time 228, 232 of the discovery UE receive chain 226.

In this example, for a UE with the dedicated RX chain for D2D discovery, the discovery gap length may be as short as the duration of the RX chain RF retuning 342, 346. For both examples of the discovery gap, any interruption due to RF retuning may be avoided. As a result, various embodiments may be described as below, both generally and with specificity. For inter frequency/PLMN discovery the discovery gap provides significant benefits, there is accordingly, no need for an interruption.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 4:
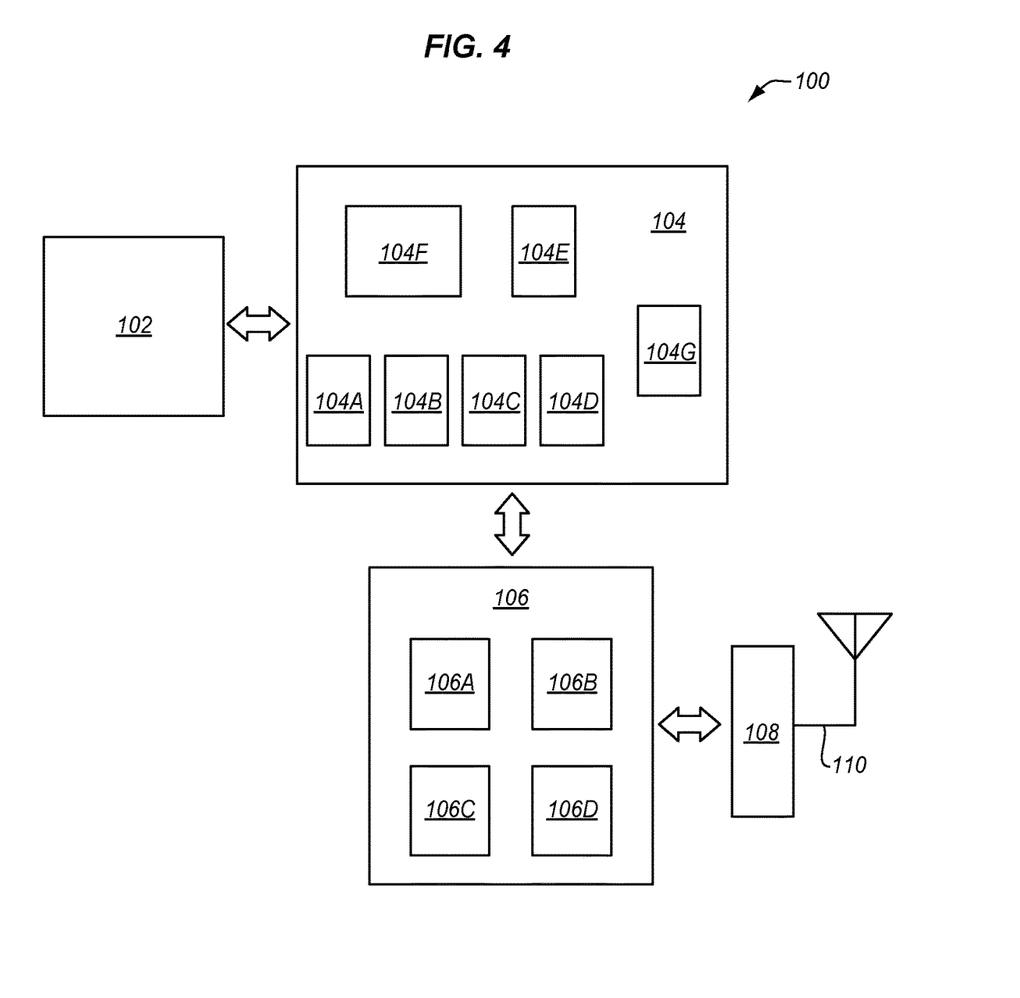
FIG. 4 is a block diagram of a core network device according to an embodiment.

Embodiments described herein may be implemented into a system using any suitably configured hardware and/or software. FIG. 4 illustrates, for one embodiment, example components of an electronic device 100. In embodiments, the electronic device 100 may be implemented as, be incorporated into, or otherwise be a part of a user equipment (UE), an evolved NodeB (eNB), or some other electronic device. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage 104g. The memory/storage 104g may be used to load and store data and/or instructions for operations performed by the processors of the baseband circuitry 104. Memory/storage for one embodiment may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface.

In some embodiments, the electronic device may be configured to perform one or more methods, techniques, and/or processes as described herein, or portions thereof.

Figure 5:
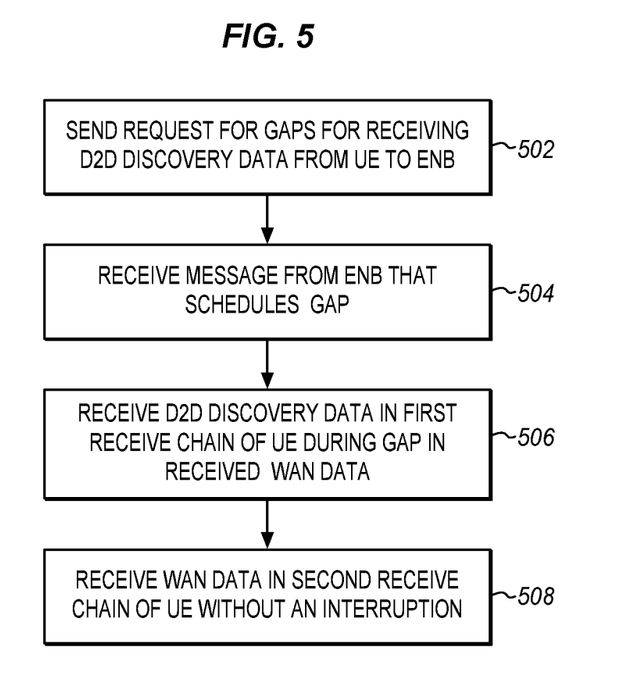
FIG. 5 is a process flow diagram of D2D discovery with an inter-carrier discovery gap according to an embodiment.

FIG. 5 is a process flow diagram to describe a process as described above using the gaps as mentioned. When a UE is connected to an eNB and seeks D2D discovery the process optionally starts at 502 with the UE sending a request for gaps to be used for receiving D2D discovery data to the connected eNB. The eNB may then respond with a schedule or configuration message. The UE at 504 optionally receives a message from the eNB that schedules the gap.

At 506 the UE uses the schedule for receiving data on downlink channels through its receive chains. The UE receives D2D discovery data in a first receive chain during a set of subframes. At the same time at 508 the UE receives WAN data in a second receive chain from for example a primary cell (PCell) during the same set of subframes. In this process, the D2D discovery data is received during a gap in receiving the WAN data without an interruption in the WAN data. There may additional receive chains and cells. In addition, the same or a similar approach may be applied to the transmit chain.

The detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed embodiments. However, it will be apparent to those skilled in the art having the benefit of the present disclosure that the various aspects of the embodiments claimed may be practiced in other examples that depart from these specific details. In certain instances, descriptions of well-known devices, circuits, and methods are omitted so as not to obscure the description of the present embodiments with unnecessary detail.

The present description of one or more implementations provides illustration and description, but is not intended to be exhaustive or to limit the scope of the claims to the precise form disclosed. Modifications and variations are possible in light of the above teachings or may be acquired from practice of various implementations of which the following examples pertain.

Example 1 may include a method to specify a device to device (D2D) user equipment (UE) interruption requirement, wherein the interruption will not be allowed.

Example 2 may include the method of example 1 or some other example herein, wherein for the D2D inter-carrier and inter-public land mobile network (PLMN) discovery, there are discovery gaps.

Example 3 may include the method of example 2 or some other example herein, wherein the discovery gap for inter-carrier and inter-PLMN D2D discovery cannot allow wireless area network (WAN) data transmission.

Example 4 may include the method of example 3 or some other example herein, wherein there is not dedicated radio frequency (RF) chain for D2D.

Example 5 may include the method of example 2 or some other example herein, wherein the discovery gap for inter-carrier and inter-PLMN D2D discovery can be occurred only before and after UE re-tuning.

Example 6 may include the method of example 2 or some other example herein, wherein there is a dedicated RF chain for D2D at least.

Example 7 may include an apparatus comprising means to perform one or more elements of a method described in or related to any of examples 1-6, or any other method or process described herein.

Example 8 may include one or more non-transitory computer-readable media comprising instructions to cause an electronic device, upon execution of the instructions by one or more processors of the electronic device, to perform one or more elements of a method described in or related to any of examples 1-6, or any other method or process described herein.

Example 9 may include an apparatus comprising logic, modules, and/or circuitry to perform one or more elements of a method described in or related to any of examples 1-6, or any other method or process described herein.

Example 10 may include a method, technique, or process as described in or related to any of examples 1-6, or portions or parts thereof.

Example 11 may include an apparatus comprising: one or more processors and one or more computer readable media comprising instructions that, when executed by the one or more processors, cause the one or more processors to perform the method, techniques, or process as described in or related to any of examples 1-18, or portions thereof.

Example 12 may include a method of communicating in a wireless network as shown and described herein.

Example 13 may include a system for providing wireless communication as shown and described herein.

Example 14 may include a device for providing wireless communication as shown and described herein.

Example A may include one or more non-transitory computer-readable media comprising instructions to cause an electronic device, upon execution of the instructions by one or more processors of the electronic device, to perform one or more operations comprising receiving device-to-device (D2D) discovery data on a D2D discovery data frequency in a receive chain of a user equipment (UE) during a set of subframes, tuning the receive chain of the UE to a wireless access network (WAN) data frequency, and receiving WAN data in the receive chain of the UE on the WAN data frequency from a primary cell (PCell) during the set of subframes, wherein the D2D discovery data is received during a gap in receiving the WAN data without an interruption in the WAN data.

Example B may include the media of example A, wherein an interruption requirement is based on a configuration of the gap in receiving the WAN data.

Example C may include the media of example A or B, wherein the gap is during a retuning of the receive chain from the WAN data frequency to the D2D discovery data frequency to receive the D2D data and the retuning from the D2D discovery data frequency to the WAN data frequency.

Example D may include the media of example C, wherein the gap does not include the duration of receiving the D2D discovery data.

Example E may include the media of any of examples A-D, the operations further comprising receiving a message from an evolved nodeB (eNB) that schedules the gap.

Example F may include the media of example E, the operations further comprising sending a request for gaps for receiving D2D discovery data from the UE to the eNB.

Example G may include the media of any of examples A-F, further comprising receiving WAN data on a second WAN data frequency in a second receive chain from a secondary cell (SCell) during the set of subframes.

Example H may include the media of example G, the instructions further comprising a restriction that carrier aggregation is not supported for different receive frequencies.

Example I may include the media of example G, wherein the first and second receive chains operate simultaneously, the instructions further comprising a restriction that carrier aggregation is supported for different receive frequencies.

Example J may include an apparatus comprising one or more processors and one or more computer readable media comprising instructions that, when executed by the one or more processors, cause the one or more processors to perform specifying a device to device (D2D) user equipment (UE) interruption requirement for D2D discovery, wherein the interruption will not be allowed.

Example K may include the apparatus of example J, wherein for a D2D inter-carrier and inter-public land mobile network (PLMN) discovery, there are gaps for discovery and interruption depends on an assigned gap configuration.

Example L may include the apparatus of example K, wherein the discovery gap for inter-carrier and inter-PLMN D2D discovery cannot allow wireless area network (WAN) data transmission, for example because an eNB does not schedule any transmission data for WAN during the gap.

Example M may include the apparatus of example L, wherein there is no dedicated radio frequency (RF) chain for D2D.

Example N may include the apparatus of any of examples J-M, wherein the discovery gap for inter-carrier and inter-PLMN D2D discovery is scheduled during UE re-tuning and only before and after UE D2D discovery receive.

Example O may include processing circuitry of a user equipment (UE), the processing circuitry to configure a receive chain of a user equipment (UE) to receive device-to-device (D2D) discovery data on a D2D discovery data frequency during a set of subframes, tune the receive chain of the UE to a wireless access network (WAN) data frequency, and configure the receive chain of the UE to receive WAN data on the WAN data frequency from a primary cell (PCell) during the set of subframes, wherein the D2D discovery data is received during a gap in receiving the WAN data without an interruption in the WAN data.

Example P may include the circuitry of example O, the circuitry further to receive a message from an evolved nodeB (eNB) that schedules the gap.

Example Q may include the circuitry of example O, the circuitry further to send a request for gaps for receiving D2D discovery data from the UE to the eNB.

Example R may include an apparatus comprising a receive chain of a user equipment (UE) to receive device-to-device (D2D) discovery data during a set of subframes, a tuner to tune the receive chain of the UE to a wireless access network (WAN) data frequency, and the receive chain of the UE to receive wireless access network (WAN) data from a primary cell (PCell) during the set of subframes, wherein the D2D discovery data is received during a gap in receiving the WAN data without an interruption in the WAN data.

Example S may include the apparatus of example R, wherein the gap is during a retuning of the receive chain from the WAN data frequency to the D2D discovery data frequency to receive the D2D data and the retuning from the D2D discovery data frequency to the WAN data frequency.

Example T may include the apparatus of examples R and S, wherein the gap does not include the duration of receiving the D2D discovery data.

The invention claimed is:

1. One or more non-transitory computer-readable media comprising instructions to cause an electronic device, upon execution of the instructions by one or more processors of the electronic device, to perform one or more operations comprising:
receiving device-to-device (D2D) discovery data on a D2D discovery data frequency in a receive chain of a user equipment (UE) during a set of subframes;
tuning the receive chain of the UE to a wireless access network (WAN) data frequency; and
receiving WAN data in the receive chain of the UE on the WAN data frequency from a primary cell (PCell) during the set of subframes,
wherein the D2D discovery data is received during a gap in receiving the WAN data without an interruption in the WAN data.

2. The media of claim 1, wherein an interruption requirement is based on a configuration of the gap in receiving the WAN data.

3. The media of claim 1, wherein the gap is during a retuning of the receive chain from the WAN data frequency to the D2D discovery data frequency to receive the D2D data and the retuning from the D2D discovery data frequency to the WAN data frequency.

4. The media of claim 3, wherein the gap does not include the duration of receiving the D2D discovery data.

5. The media of claim 1, the operations further comprising receiving a message from an evolved nodeB (eNB) that schedules the gap.

6. The media of claim 5, the operations further comprising sending a request for gaps for receiving D2D discovery data from the UE to the eNB.

7. The media of claim 1, further comprising receiving WAN data on a second WAN data frequency in a second receive chain from a secondary cell (SCell) during the set of subframes.

8. The media of claim 7, the instructions further comprising a restriction that carrier aggregation is not supported for different receive frequencies.

9. The media of claim 7, wherein the first and second receive chains operate simultaneously, the instructions further comprising a restriction that carrier aggregation is supported for different receive frequencies.

10. An apparatus comprising:
one or more processors and one or more computer readable media comprising instructions that, when executed by the one or more processors, cause the one or more processors to perform specifying a device to device (D2D) user equipment (UE) interruption requirement for D2D discovery, wherein the interruption will not be allowed, wherein for a D2D inter-carrier and inter-public land mobile network (PLMN) discovery, there are gaps for discovery and interruption depends on an assigned gap configuration.

11. The apparatus of claim 10, wherein the discovery gap for inter-carrier and inter-PLMN D2D discovery cannot allow wireless area network (WAN) data transmission, for example because an eNB does not schedule any transmission data for WAN during the gap.

12. The apparatus of claim 11, wherein there is no dedicated radio frequency (RF) chain for D2D.

13. The apparatus of claim 10, wherein the discovery gap for inter-carrier and inter-PLMN D2D discovery is scheduled during UE re-tuning and only before and after UE D2D discovery receive.

14. A processing circuitry of a user equipment (UE), the processing circuitry to:
configure a receive chain of a user equipment (UE) to receive device-to-device (D2D) discovery data on a D2D discovery data frequency during a set of subframes;
tune the receive chain of the UE to a wireless access network (WAN) data frequency; and configure the receive chain of the UE to receive WAN data on the WAN data frequency from a primary cell (PCell) during the set of subframes, wherein the D2D discovery data is received during a gap in receiving the WAN data without an interruption in the WAN data.

15. The circuitry of claim 14, the circuitry further to receive a message from an evolved nodeB (eNB) that schedules the gap.

16. The circuitry of claim 15, the circuitry further to send a request for gaps for receiving D2D discovery data from the UE to the eNB.

17. An apparatus comprising:
- a receive chain of a user equipment (UE) to receive device-to-device (D2D) discovery data during a set of subframes;
- a tuner to tune the receive chain of the UE to a wireless access network (WAN) data frequency; and
- the receive chain of the UE to receive wireless access network (WAN) data from a primary cell (PCell) during the set of subframes,
- wherein the D2D discovery data is received during a gap in receiving the WAN data without an interruption in the WAN data.

18. The apparatus of claim 17, wherein the gap is during a retuning of the receive chain from the WAN data frequency to the D2D discovery data frequency to receive the D2D data and the retuning from the D2D discovery data frequency to the WAN data frequency.

19. The apparatus of claim 18, wherein the gap does not include the duration of receiving the D2D discovery data.

\* \* \* \* \*